United States Patent [19]
Kushima

[11] Patent Number: 4,825,060
[45] Date of Patent: Apr. 25, 1989

[54] PORTABLE MEMORY MEDIUM
[75] Inventor: Hidekiyo Kushima, Kanagawa, Japan
[73] Assignee: Kabushiki Kaisha Toshiba, Kawasaki, Japan
[21] Appl. No.: 60,387
[22] Filed: Jun. 10, 1987
[30] Foreign Application Priority Data
Jun. 11, 1986 [JP] Japan ................................. 61-133767
[51] Int. Cl.⁴ ............................................. G06K 19/06
[52] U.S. Cl. ....................................... 235/492; 235/487
[58] Field of Search ................................. 235/487, 492
[56] References Cited
U.S. PATENT DOCUMENTS
4,692,604 9/1987 Billings ............................. 235/492 X Primary Examiner—Harold I. Pitts
Attorney, Agent, or Firm—Cushman, Darby & Cushman

[57] ABSTRACT

A portable memory medium comprises a common connection terminal and a plurality of independent connection terminals to be electrically connected to an external apparatus, and a constant voltage semiconductor chip connected to the common connection terminal and the independent connection terminals. The constant voltage semiconductor chip includes a common constant voltage element having a first terminal connected to the common connection terminal and a second terminal which is different from the first terminal, and a plurality of independent constant voltage elements having first terminals connected to the independent connection terminals, respectively, and second terminals commonly connected to the second terminal of the common constant voltage element.

6 Claims, 6 Drawing Sheets

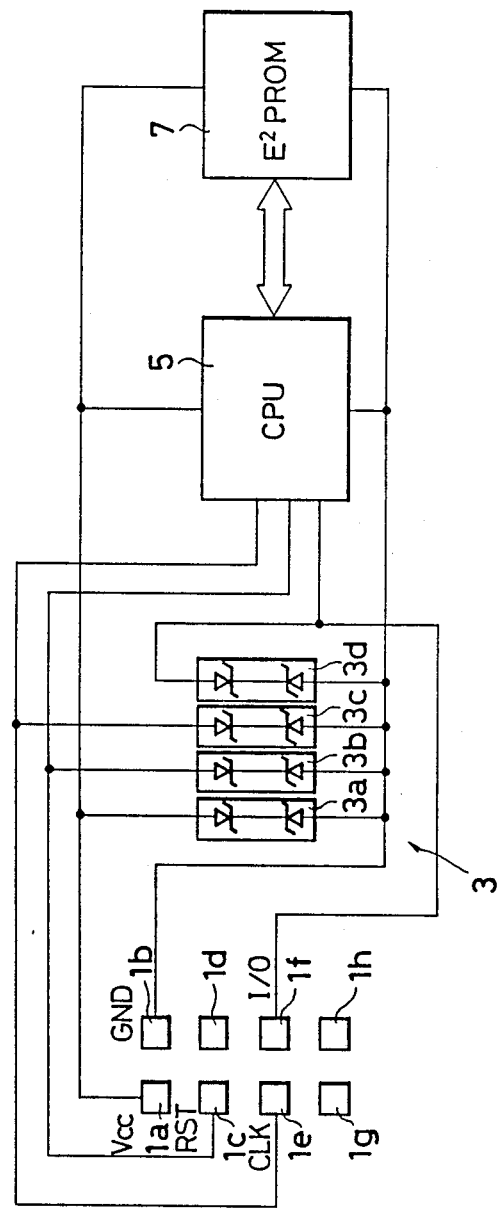

3a,3b,3c,3d

PORTABLE MEMORY MEDIUM

BACKGROUND OF THE INVENTION

1. Field of the Invention

The present invention relates to a card-like portable memory medium, a so-called IC card made by laminating integrated circuit chips such as a memory circuit and a microcomputer to store various kinds of information, and particularly to an improvement of a protective circuit connected to connection terminals of the portable memory medium.

2. Description of the Prior Art

An IC card complies with the ISO standards for its various performances. Among the ISO standards, there is an electrostatic test. The IC card is carried by a person under various environmental conditions and frequently subjected to an external large static electricity. The IC card has a plurality of connection terminals to be electrically connected to an external apparatus such as an automatic transaction machine (ATM) installed in banking agencies, and the connection terminals are internally connected to IC chips such as a microcomputer and a memory circuit. If these internal IC chips are subjected to the static electricity, they may be destroyed.

An object of the electrostatic test of the ISO standards is to prevent the IC card from easily being destroyed by such external static electricity. The IC card has a common connection terminal, i.e., a grounding terminal (GND) for supplying common potential, and a plurality of independent connection terminals such as a power source voltage terminal (Vcc), an input/output terminal, a reset signal terminal, and a clock signal terminal. The electrostatic test of the ISO standards applies 1,500 volts charged in a capacitor of 100 pF to positions between the grounding terminal and the respective independent connection terminals through a resistor of 1,000 ohms to see whether or not the internal circuits of the IC card can withstand the applied electricity.

The IC card is equipped with, therefore, a protective circuit which can withstand the test and protect the internal circuits of the IC card against external static electricity.

FIG. 1A is a circuit diagram showing an IC card having a prior art protective circuit. The IC card has connection terminals $1a$ to $1h$ for connecting the IC card to an external apparatus. The connection terminals are, for instance, a power source voltage terminal (Vcc) $1a$, a grounding terminal (GND) $1b$, a reset signal terminal (RST) $1c$ a clock signal terminal (CLK) $1e$, an input/output terminal (I/O) $1f$ etc. The respective connection terminals are connected through a protective circuit 3 to integrated circuit chips such as a CPU 5 comprising a microprocessor, and a memory circuit 7 comprising an E²PROM.

The protective circuit 3 has four zener diode blocks $3a$, $3b$ $3c$, and $3d$ arranged in parallel with each other, each comprising a pair of zener diodes connected in series in reverse polarity. Each of the zener diode blocks $3a$, $3b$, $3c$, and $3d$ has a first and a second zener diodes, cathodes of which are internally interconnected, and is formed as a single semiconductor element of a rectangular parallelepiped. The four zener diode blocks constitute the protective circuit 3.

Anodes of the first zener diodes of the zener diode blocks $3a$, $3b$, $3c$ and $3d$ are connected commonly and connected to the grounding terminal $1b$. An anode of the second zener diode of the first zener diode block $3a$ is connected to the power source voltage terminal $1a$, an anode of the second zener diode of the second zener diode block $3b$ to the reset signal terminal $1c$, an anode of the second zener diode of the third zener diode block $3c$ to the clock signal terminal $1e$, and an anode of the second zener diode of the fourth zener diode block $3d$ to the input/output terminal $1f$.

In the IC card having the protective circuit 3 of the above arrangement, when static electricity or an extremely high voltage such as 1,500 volts in the electrostatic test of the ISO standards is applied between the grounding terminal $1b$ and the respective terminals i.e., the power source voltage terminal $1a$, reset signal terminal $1c$, clock signal terminal $1e$, and input/output terminal $1f$, the zener breakdown or the avalanche breakdown of the zener diodes is caused to prevent the internal circuits connected to the respective connection terminals from being destroyed.

Namely, the zener diode blocks $3a$, $3b$, $3c$, and $3d$ are connected between the grounding terminal $1b$ and the connection terminals $1a$, $1c$, $1e$, and $1f$ respectively, and, when a high voltage of, for instance, 1,500 volts of any polarity is applied between the terminals, one of the zener diodes of each of the zener diode blocks is in the forward direction with respect to the applied voltage. Accordingly, most of the high voltage is given to the other zener diodes of the zener diode blocks, and the other zener diodes will demonstrate the zener breakdown or the avalanche breakdown with respect to the high voltage to decrease the applied high voltage to a constant voltage of the zener diodes. In this way, even if a high voltage is applied between the terminals, the voltage between the terminals is suppressed to the constant voltage of the zener diodes, for instance 6.5 volts, so that the high voltage is not applied to the internal circuits connected to the terminals, thereby preventing the internal circuits from being destroyed by the high voltage.

FIG. 2A is a circuit diagram showing another example of the prior art protective circuit used for an IC card. A circuit constitution of this protective circuit 30 is similar to that of the protective circuit 3 shown in FIG. 1A. A difference between them is that the protective circuit 3 shown in FIG. 1A has four separate zener diode elements each having a rectangular parallelepiped with a pair of zener diodes, and the protective circuit 30 shown in FIG. 2A comprises eight zener diodes which are formed by diffusion on a single semiconductor chip as shown in FIG. 2B. A circuit constitution inside the IC card connected to the protective circuit 30 is the same as that of the circuit shown in FIGS. 1A and 1B.

As shown in FIG. 2B, by forming the protective circuit 30 of eight zener diodes as a single semiconductor chip, the protective circuit may easily be assembled in the IC card.

Since the protective circuit 3 shown in FIG. 1A is made by connecting four separate zener diode block elements each having a rectangular parallelepiped, the number of assembling processes is large, deteriorating the productivity, and the size is hardly minimized, causing a problem that it is vulnerable to a bending test of IC card.

Although the protective circuit 30 shown in FIGS. 2A and 2B is constituted by a single semiconductor chip, it requires eight zener diodes and relatively enlarges the size of its structure. Therefore, similar to the protective circuit 3 shown in FIG. 1A, the electrostatic capacitance of a junction of a zener diode of the prior art protective circuit is increased, causing problems that it may exceed the maximum capacitance, for instance 30 pF, specified by the ISO standards, and that it is vulnerable to the bending test of IC card due to the large structure size. Since the IC card is carried by a person, it should be strong to a certain extent against bending. To check the bending strength, the ISO standards include a bending test in which a transversal twist, etc., of the IC card are checked. Since the protective circuits shown in FIGS. 1 and 2 have relatively large structures, a large bending force is applied to elements constituting the protective circuits, destroying the elements.

SUMMARY OF THE INVENTION

In order to solve the above problems, an object of the present invention is to provide a portable memory medium having a protective circuit which has a small electrostatic capacitance, and is compact, and realizes high productivity, and has a large bending strength.

In order to accomplish the objects and advantages mentioned in the above, the present invention provides a portable memory medium having a common connection terminal and a plurality of independent connection terminals to be electrically connected to an external apparatus, and integrated circuit chips connected to the connection terminals, the portable memory medium comprising a constant voltage semiconductor chip having a common constant voltage element whose first electrode is connected to the common connection terminal, and a plurality of independent voltage elements whose second electrodes are commonly connected to a second electrode of the common constant voltage element and whose first electrodes are connected to the independent connection terminals respectively.

BRIEF DESCRIPTION OF THE DRAWINGS

The other objects, features and advantages of the present invention will become apparent from the following descriptions of the preferred embodiments taken in conjunction with the accompanying drawings in which:

FIGS. 1A and 1B are a circuit diagram showing a portable memory medium according to the prior art, and a structural view showing a zener diode block element used for a protective circuit of the prior art portable memory medium;

DETAILED DESCRIPTION OF THE PREFERRED EMBODIMENTS

Embodiments of the present invention will be described with reference to the accompanying drawings.

Figure 2A:
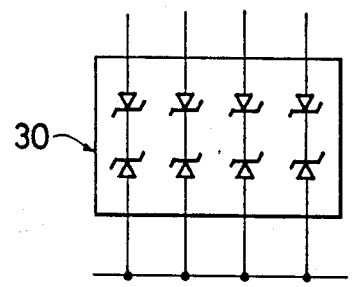
FIGS. 2A and 2B are a circuit diagram showing another prior art protective circuit used for a portable memory medium, and a plan view showing a semiconductor chip constituting the protective circuit.
Figure 2B:
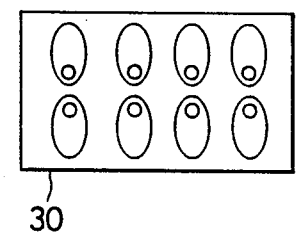
Figure 3:
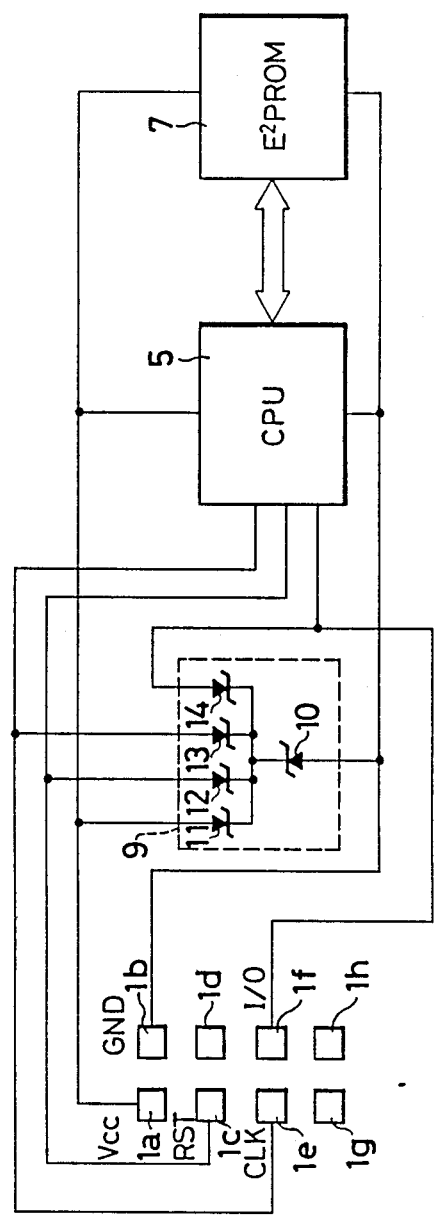
FIG. 3 is a circuit diagram showing a portable memory medium according to an embodiment of the present invention.

FIG. 3 is a circuit diagram showing a portable memory medium, a so-called IC card according to an embodiment of the present invention. The IC card has, similar to the one shown in FIG. 1A, connection terminals 1a to 1h to be connected to an external apparatus. The connection terminals are, for instance, a power source voltage terminal (Vcc) 1a, a grounding terminal (GND) 1b, a reset signal terminal (RST) 1c, a clock signal terminal (CLK) 1e, an input/output terminal (I/O) 1f, etc. The connection terminals are connected through a protective circuit 9 to integrated circuit chips such as a CPU 5 comprising a microprocessor, a memory circuit 7 comprising E²PROM, etc. The IC card has the same constitution as that of the IC card shown in FIGS. 1 or 2 except for the protective circuit.

The protective circuit 9 of this embodiment has a common constant voltage element 10 comprising a zener diode whose anode is connected to the grounding terminal 1b, and a plurality, in this embodiment four, of independent constant voltage elements 11, 12, 13, and 14 each comprising a zener diode. Anodes of the independent constant voltage elements 11 to 14 are connected to the connection terminals 1a, 1c, 1e, and 1f, respectively. The other electrode, i.e., a cathode of the common constant voltage element 10 is commonly connected to cathodes of the independent constant voltage elements 11 to 14.

Figure 1B:
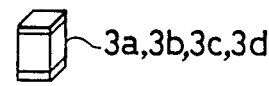

In the protective circuit 9 with the above-mentioned connections, similar to the protective circuit shown in FIGS. 1 or 2, there are a pair of zener diodes connected in series with reverse polarity between the anode terminal 1b and each of the connection terminals. When a high voltage is applied between the terminals, the zener breakdown or the avalanche breakdown is caused to lower the high voltage to a predetermined constant voltage of the zener diodes so that the high voltage applied to the connection terminals is not applied to the internal integrated circuits, thereby preventing the internal integrated circuits from being destroyed.

Figure 4A:
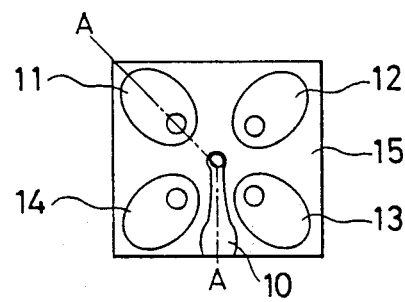
FIGS. 4A to 4C are plan views showing constant voltage semiconductor chips respectively, each chip for a protective circuit used for the portable memory medium shown in FIG. 3.
Figure 4B:
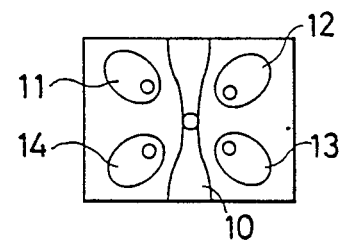
Figure 4C:
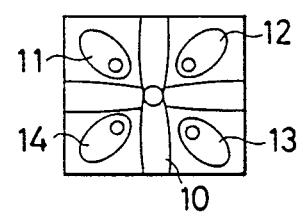

The protective circuit 9 comprises the single common constant voltage element 10 and a plurality of the independent constant voltage elements 11 to 14, which are formed in one semiconductor integrated circuit chip as shown in FIGS. 4A to 4C. According to this integrated circuit arrangement, the common constant voltage element 10 is formed near the center of a semiconductor silicon substrate 15, and, around the element 10, there are formed a plurality of the independent constant voltage elements 11 to 14.

FIGS. 4A to 4C are views showing various constitutions of the constant voltage element in the protective circuit 9. For all these constitutions, the common constant voltage element 10 is formed in the center thereof, and the independent constant voltage elements 11 to 14 are formed around the element 10. With such arrangements, one electrode, for instance a cathode of the common constant voltage element 10 formed in the center can easily be connected with a short length to cathodes of the independent constant voltage elements 11 to 14, thereby making the overall size of the chip compact. As shown in FIGS. 4A to 4C, not only the common constant voltage element 11 is formed in the center, but also a part thereof is extended between the independent constant voltage elements to connect or isolate the elements effectively with high performance.

Figure 5:
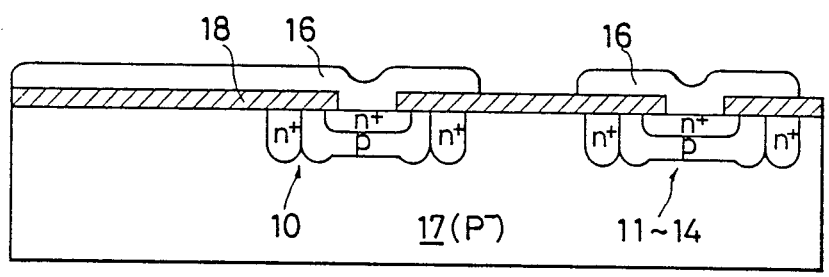
FIG. 5 is a cross-sectional view taken along line A—A shown in FIG. 4A.

FIG. 5 is a view showing the cross-sectional constitution of a constant voltage semiconductor integrated circuit chip constituting the protective circuit 9 shown in FIG. 4A. Zener diodes constituting each of the constant voltage elements are formed in a bulk layer of a semiconductor silicon substrate by a normal PN junction. The independent constant voltage elements 11 to 14 are formed around the common constant voltage element 10. A numeral 16 represents an aluminum layer, 17 the bulk layer, and 18 an oxide film.

As described in the above, according to the present invention, there is provided a portable memory medium having a constant voltage semiconductor chip in which a common connection terminal of a common constant voltage element is connected to respective independent connection terminals of a plurality of independent constant voltage elements. Therefore, an electrostatic capacitance between the common connection terminal and the respective independent connection terminals is small, and the portable memory medium, i.e., an IC card provided with such a constant voltage semiconductor chip has a relatively large strength in bending, and is easily assembled, improving the productivity.

What is claimed is:

1. A portable memory medium comprising:
   a common connection terminal and a plurality of independent connection terminals to be electrically connected to an external apparatus; and
   a constant voltage semiconductor chip connected to said common connection terminal and said independent connection terminals, said constant voltage semiconductor chip including
   a common constant voltage element having a first terminal connected to said common connection terminal, and a second terminal which is different from said first terminal; and
   a plurality of independent constant voltage elements each having a first terminal connected to each of said independent connection terminals, and a second terminal commonly connected to said second terminal of said common constant voltage element.

2. A portable memory medium as claimed in claim 1, wherein said independent constant voltage elements and said common constant voltage element are formed on a single semiconductor wafer.

3. A portable memory medium as claimed in claim 2, wherein said independent constant voltage elements are disposed around said common constant voltage element.

4. A portable memory medium as claimed in claim 1, wherein said common constant voltage element and said independent constant voltage elements comprise constant voltage element diodes, respectively, and the first terminals of said common constant voltage element and said independent constant voltage elements are anodes while the second terminals of said common constant voltage element and said independent constant voltage elements are cathodes.

5. A portable memory medium as claimed in claim 1, wherein said common constant voltage element and said independent constant voltage elements comprise constant voltage element diodes, respectively, and the first terminals of said common constant voltage element and said independent constant voltage elements are cathodes while the second terminals of said common constant voltage element and said independent constant voltage elements are anodes.

6. A portable memory medium as claimed in claim 1, wherein said memory medium is an IC card.

* * * * *